US012235708B2

(12) United States Patent
Tsien et al.

(10) Patent No.: US 12,235,708 B2
(45) Date of Patent: Feb. 25, 2025

(54) DEVICE AND METHOD FOR TWO-STAGE TRANSITIONING BETWEEN REDUCED POWER STATES

(71) Applicant: Advanced Micro Devices, Inc., Santa Clara, CA (US)

(72) Inventors: Benjamin Tsien, Santa Clara, CA (US); Alexander J. Branover, Boxborough, MA (US); Indrani Paul, Austin, TX (US); Christopher T. Weaver, Boxborough, MA (US); Thomas J. Gibney, Boxborough, MA (US); Stephen V. Kosonocky, Fort Collins, CO (US); John P. Petry, San Diego, CA (US); Mihir Shaileshbhai Doctor, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 688 days.

(21) Appl. No.: 17/483,702

(22) Filed: Sep. 23, 2021

(65) Prior Publication Data
US 2023/0090567 A1 Mar. 23, 2023

(51) Int. Cl.
*G06F 1/32* (2019.01)
*G06F 1/3234* (2019.01)

(52) U.S. Cl.
CPC .................. *G06F 1/3234* (2013.01)

(58) Field of Classification Search
CPC .......................................................... G06F 1/32
See application file for complete search history.

(56) References Cited

U.S. PATENT DOCUMENTS

| 8,543,826 | B1 | 9/2013 | Hutchison et al. |
| 2011/0268000 | A1 | 11/2011 | Kashikar et al. |
| 2013/0055000 | A1* | 2/2013 | Lee ........................ G06F 9/4418 |
| | | | 713/323 |
| 2015/0127968 | A1 | 5/2015 | Chi et al. |
| 2017/0093746 | A1 | 3/2017 | Gahlot et al. |
| 2017/0153902 | A1* | 6/2017 | Lin ......................... G06F 9/4418 |
| 2019/0108861 | A1* | 4/2019 | Tsien ..................... G06F 13/4022 |

FOREIGN PATENT DOCUMENTS

KR 10-2042495 B1 11/2019

* cited by examiner

*Primary Examiner* — Paul B Yanchus, III
(74) *Attorney, Agent, or Firm* — Volpe Koenig

(57) ABSTRACT

Devices and methods for cache prefetching are provided. A device is provided which comprises a quality of service (QOS) component having first assigned registers used to store data to execute a program, a plurality of non-QOS components having second assigned registers used to store data to execute the program and a power management controller, in communication with the QOS component and the non-QOS components. The power management controller is configured to issue fences for the non-QOS components when it is determined that one or more of the non-QOS components are idle, issue a fence for the QOS component when the fences for the non-QOS components are completed and enter a reduced power state when the fences for the non-QOS components and the fence for the QOS component are completed.

20 Claims, 8 Drawing Sheets

DEVICE AND METHOD FOR TWO-STAGE TRANSITIONING BETWEEN REDUCED POWER STATES

BACKGROUND

Computing systems are increasingly integrating large numbers of different types of components on a single chip or on multi-chip modules. The complexity and power consumption of a system increases with the number of different types of components. Power management is an important aspect of the design and operation of integrated circuits, especially circuits that are integrated within devices which typically rely on battery power, such as mobile devices. Reducing power consumption in the integrated circuits of these devices can increase the life of the battery as well as decrease the heat generated by the integrated circuits.

BRIEF DESCRIPTION OF THE DRAWINGS

A more detailed understanding can be had from the following description, given by way of example in conjunction with the accompanying drawings wherein.

DETAILED DESCRIPTION

Figure 1:
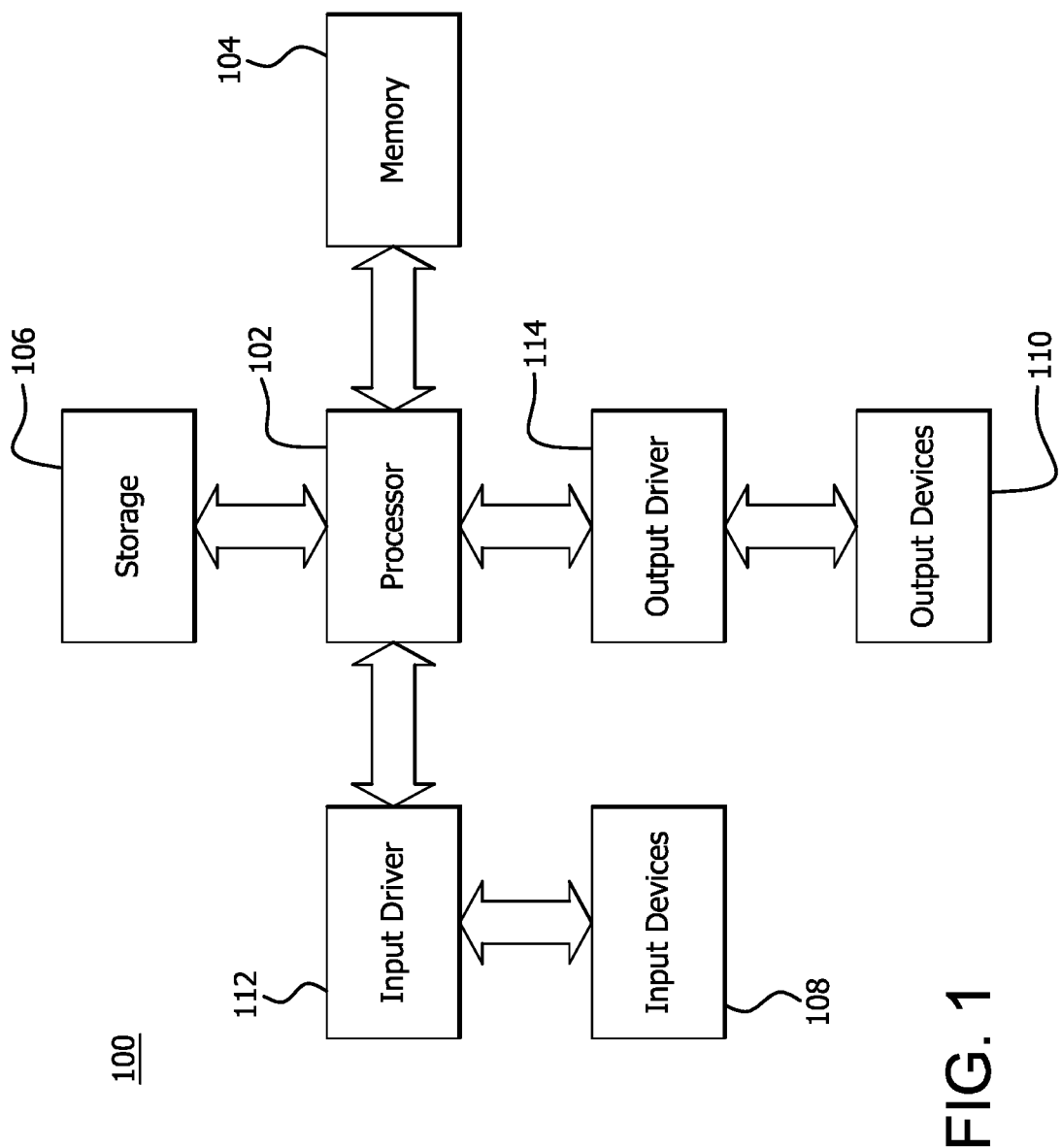
FIG. 1 is a block diagram of an example device in which one or more features of the disclosure can be implemented.

Some conventional devices reduce power consumption by entering a reduced power state (e.g., a power-gated state), which is a state in which a device or one or more components of the device are operating in a mode which consumes less power than another operating mode. For example, in some implementations the power that would ordinarily be used to retain a present power state is removed from one or more components to enter the reduced power state and consume less power. A reduced power state is entered, for example, by turning off or removing power to a component, or alternatively, reducing a power supply voltage and/or reducing a clock frequency supplied to a component.

Prior to entering a reduced power state, a configuration register state is saved to memory (e.g., dynamic random-access memory (DRAM)). A configuration register state refers to the values stored in a plurality of configuration registers, assigned to a component of a device, which identify the component, define various features of the component, and allow system software to interface with and/or control the operation of the component. The registers assigned to a component include any number and type of registers, such as routing tables, address maps, configuration data, buffer allocation information, including flow control credits (e.g., when a first component communicates its buffer counts to a second component during initialization, such that the second component has an indication of a number of packets that can be sent to the first component without pausing and waiting for the buffers to be freed up), performance registers and debug related registers.

The operating system, device drivers, and diagnostic software typically access the configuration register state during operation of a component. Upon exiting the reduced power state, the configuration register state is restored. Saving and restoring the configuration register state of the component ensures that the component operates the same way before power is removed and after power is restored and prevents the occurrence of computing errors resulting from incorrect data being stored during execution. Saving the configuration register state to memory each time the system enters the reduced power state, however, causes a delay which reduces the total amount of time spent in the reduced power state. Also, writing the configuration register state to memory incurs a power use penalty.

In shallower reduced power states, such as Z0-Z8 power states), power is supplied to one or more components. During the Z8 power state, power (e.g., voltage) is supplied to some components, but at a reduced voltage. During transitioning to and from the shallower reduced power states, the configuration register states of each component is saved and restored.

In deeper reduced power states (e.g., Z9 and Z10 power states), however, power is not supplied to components. For example, during the Z9 power state, power is supplied to the display (e.g., the display controller), but is not supplied to other components (e.g., CPU, GPU and memory controller). During the Z10 power state, power is not supplied to the display controller or these other components of the device. Accordingly, these components are unable to function and communicate data between each other.

During operation of the device, components can become idle for short intervals of time. For example, when a user is viewing a display, but the device is not receiving any user input for short periods of time (e.g., time periods between keystrokes), components (e.g., CPU, GPU and memory controller) become idle during these short periods of time. During these short periods of idle time, power consumption of the device can be reduced by transitioning to the Z9 power state and removing power supplied to these components.

Conventional systems detect the idleness (i.e., idle or not idle) of a component via software and are not able to restore power and exit a reduced power state until after multiple milliseconds (ms) have expired since the component became active (i.e., no longer idle). Accordingly, these conventional systems are not able to efficiently transition between these reduces power states for these short periods of idle time (e.g., time periods between keystrokes).

Features of the present disclosure provide efficient transitioning between different levels of reduced power states, via unique hardware of a power management controller (PMC), which identifies (e.g., via a wake signal) the idleness of one or more components and implements a handshaking process (e.g., fence requests and fence acknowledgment) with the components to efficiently transition between power states.

During transitioning to and from the Z9 power state, a portion of the configuration register state (i.e., registers corresponding to the components from which power is removed) are not saved and restored because these components are not active during the Z9 power state while a portion of the registers (e.g., registers corresponding to the display controller) is saved and restored. In the Z10 power state, however, neither the registers corresponding to the components powered off in the Z9 power state, nor the registers corresponding to the display controller are saved because none of these components are active during the Z10 power state.

Some components (e.g., display controller) have quality of service (QOS) constraints (e.g., stricter latency period tolerances for entry to and exit from a reduced power state) while other components (e.g., CPU, GPU, IO components) do not have these QOS constraints. For example, the Z9 power state also supports a display stutter mode in which the display controller continuously outputs data to a display from its data buffers. When the display buffer fills up, the device enters the reduced power state. The display buffer keeps draining to provide the data to the display. When the display buffer goes below a data threshold, the device exits the reduced power state and access to memory is restored to fill the display buffer. The device then enters the reduced power state once again and the process repeats. It is, therefore, better to allow the display controller to be able to continue to access memory for as long as possible to complete its tasks before power is removed. Accordingly, the latency periods for entry to and exit from the Z9 power state have stricter tolerances than the latency periods for the Z10 power state to efficiently implement the display stutter mode. Because the Z10 power state is enabled when a display is powered off or in panel self-refresh (PSR), a longer exit latency is tolerated in exchange for lower power.

The amount of time incurred for some non-QOS components to become fenced and available for low power entry, however, can cause inefficient execution or functional errors. For example, inefficiencies occur due to the amount of time from when a buffer (e.g., display buffer) is filled to when a component enters a reduced power state. If a QOS component, such as a display controller, fences in parallel with a non-QOS component which takes a long amount of time to become fenced and become available for low power entry (i.e., does not meet the latency tolerance for a QOS component to enter the reduced power state), the QOS component is prevented from generating requests during transitions to a reduced power state. That is, inefficiencies can occur when a display controller fills up a display buffer and is fenced off while a slow non-QOS component cannot complete its fence because its configuration register state is saved or because of another condition that prevents the component from allowing the component to transition to a reduced power state. Meanwhile, the data in the display buffer, which continues to be provided to the display, is emptied and the display buffer cannot access memory for additional data to be provided to the display during the transition to a reduced power state. Additionally, functional errors result, for example, when a component has a condition which does not allow it to be fenced and the display buffer is underrun.

Features of the present disclosure provide efficient transition to and from reduced power states by utilizing the PMC to implement a two-stage IP component/PMC interface protocol for transitioning to and from the Z9 and Z10 reduced power states. In the first stage, fence requests to remove power are first sent to the non-QOS components (e.g., CPU, GPU and IO components) and then fence requests are sent to the QOS components (e.g., display controller) in the second stage. Accordingly, the non-QOS components first complete their fences and save their configuration register states to memory (e.g., buffers) in the PMC without interfering with the data traffic generated by the QOS components. Then, the QOS components complete their fences and save their configuration register states to memory in the PMC before the device enters the reduced power state. That is, because some non-QOS components can result in inefficiencies and errors by taking too long to complete their fences and save their configuration register states, the QOS components are fenced off after fencing off the non-QOS components in 2 separate stages.

A processing device is provided which comprises a QOS component having first assigned registers used to store data to execute a program, a plurality of non-QOS components having second assigned registers used to store data to execute the program and a power management controller, in communication with the QOS component and the non-QOS components. The power management controller is configured to issue fences for the non-QOS components when it is determined that one or more of the non-QOS components are idle, issue a fence for the QOS component when the fences for the non-QOS components are completed and enter a reduced power state when the fences for the non-QOS components and the fence for the QOS component are completed.

A method of power state transitioning is provided which comprises issuing fences for non-QOS components when it is determined that one or more of the non-QOS components are idle, issuing a fence for a QOS component when the fences for the non-QOS components are completed and entering a reduced power state of a processing device when the fences for the non-QOS components and the fence for the QOS component are completed.

A non-transitory computer readable medium is provided which comprises instructions for causing a computer to execute a method of power state transitioning. The instructions comprise issuing fences for non-QOS components when it is determined that one or more of the non-QOS components are idle, issuing a fence for a QOS component when the fences for the non-QOS components are completed and entering a reduced power state when the fences for the non-QOS components and the fence for the QOS component are completed.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, one or more processor cores, wherein each processor core can be a CPU or a GPU, or a power management controller (PMC) used to manage different powers states of the device 100, such as reduced power states when the device 100 or a component of the device 100 is operating in a mode which consumes less power than a normal operating mode. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
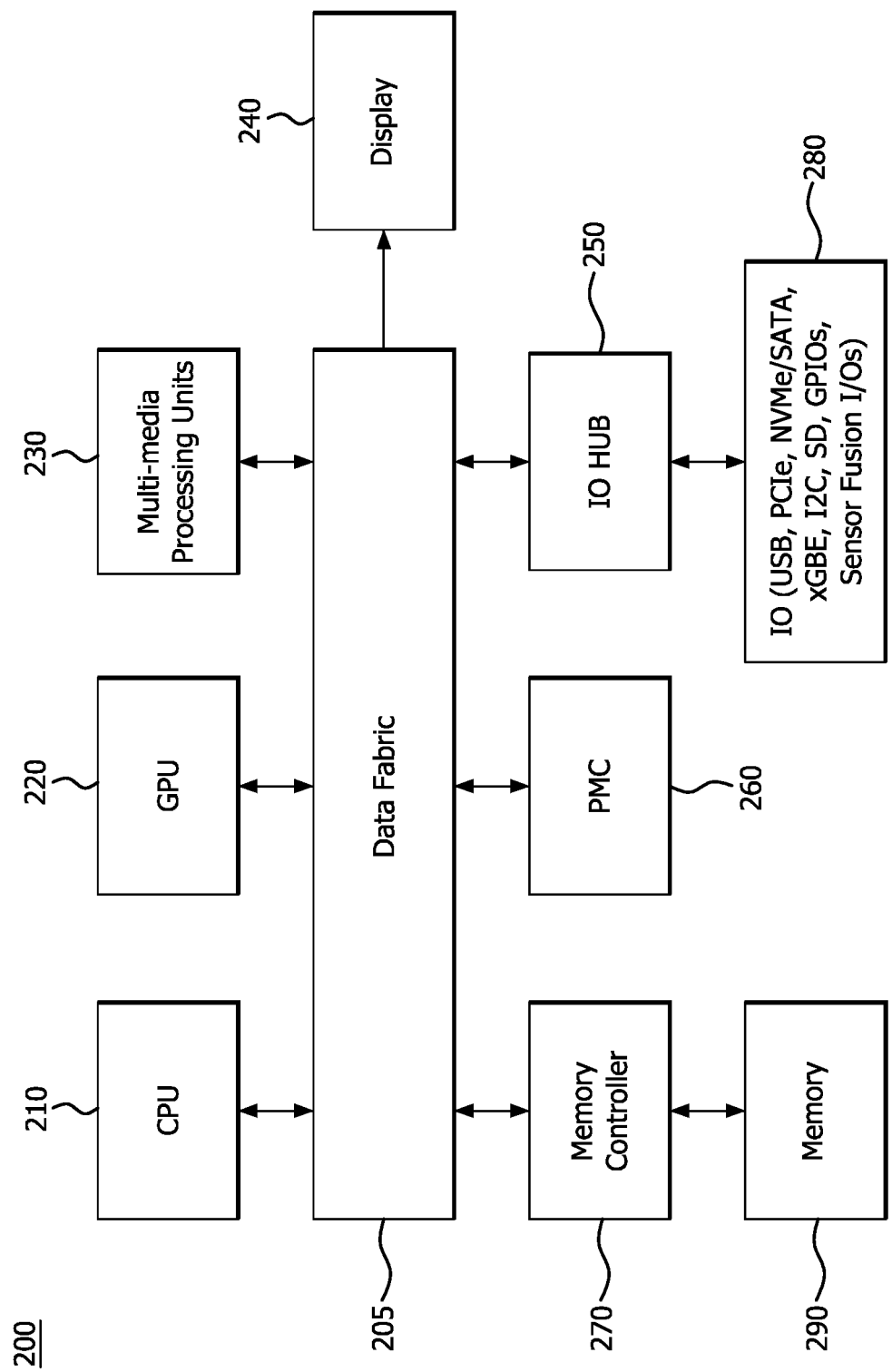
FIG. 2 is a block diagram illustrating example components, including a power management controller, for implementing one or more features of the disclosure.

FIG. 2 is a block diagram illustrating example components of a device 200, including PMC 260, for implementing one or more features of the disclosure. The components of the example device 200 include data fabric 205, which is representative of any type of communication fabric, bus, and/or other control and interface logic for communicating data between intellectual property (IP) components (referred to herein as "IP components) of a device. IP components include, for example, cores, hardware blocks, memory cells and logic used to execute various portions of a program or application. Data fabric 205 includes data paths, switches, routers, and other logic used to communicate data among the various IPs, such as CPU 210, GPU 220, multi-media processing units 230, display 240 (via a display controller 240 shown in FIG. 3), I/O hub 250 and memory controller 270. Data fabric 205 can be bus-based, including shared bus configurations, crossbar configurations, and hierarchical buses with bridges. Data fabric 205 can also be packet-based, and can be hierarchical with bridges, crossbar, point-to-point, or other interconnects. The arrows in FIG. 2 show the data flow between the IP components of the device. The DF 205 is an IP component which is responsible for both QOS and non-QOS functionalities. The non-QOS functionalities of the DF 205 include generating or servicing non-QOS traffic via data paths used by the non-QOS components and the QOS functionalities of the DF 205 include generating or servicing QOS traffic via data paths used by the QOS components.

The components of the device 200 shown in FIG. 2 also include various I/O components 280, such as for example, a universal serial bus (USB) port, a peripheral component interconnect express (PCIe) bus, a NVMe controller, a general-purpose input/output (GPIO) controller and sensor fusion I/O components.

As described in more detail below with regard to FIG. 3, PMC 260 includes a combination of hardware and firmware and interfaces with the IP components (e.g., CPU 210, GPU 220, multi-media processing units 230, display 240, I/O hub 250, and memory controller 270) via IP component control interfaces and register bus interfaces (different from the data fabric interfaces used to communicate data between IP components) to manage the transitions (e.g., entry and exit) between different powers states of a device.

Figure 3:
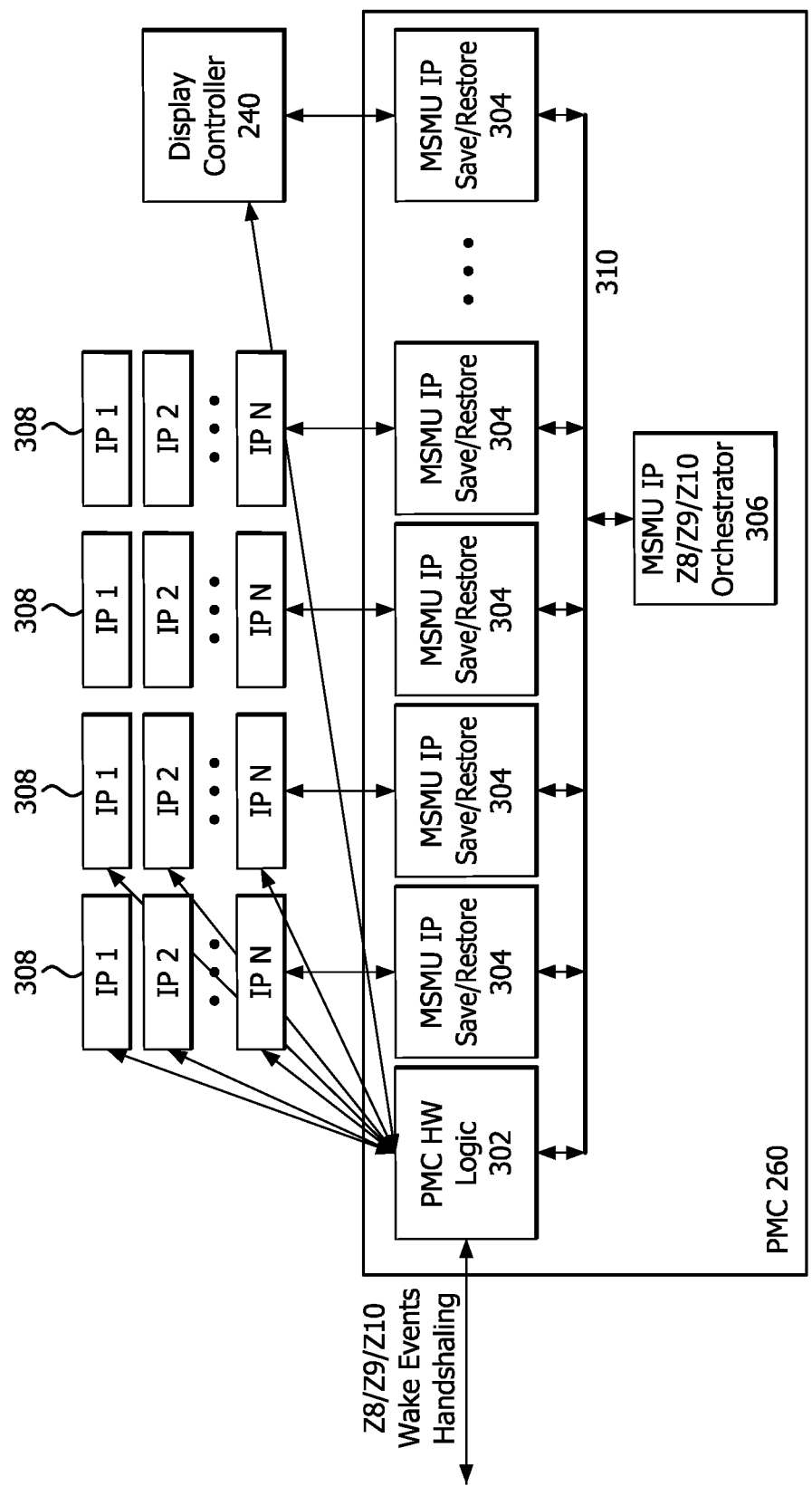
FIG. 3 is a block diagram illustrating the power management controller shown in FIG. 2 with additional detail.
Figure 5:
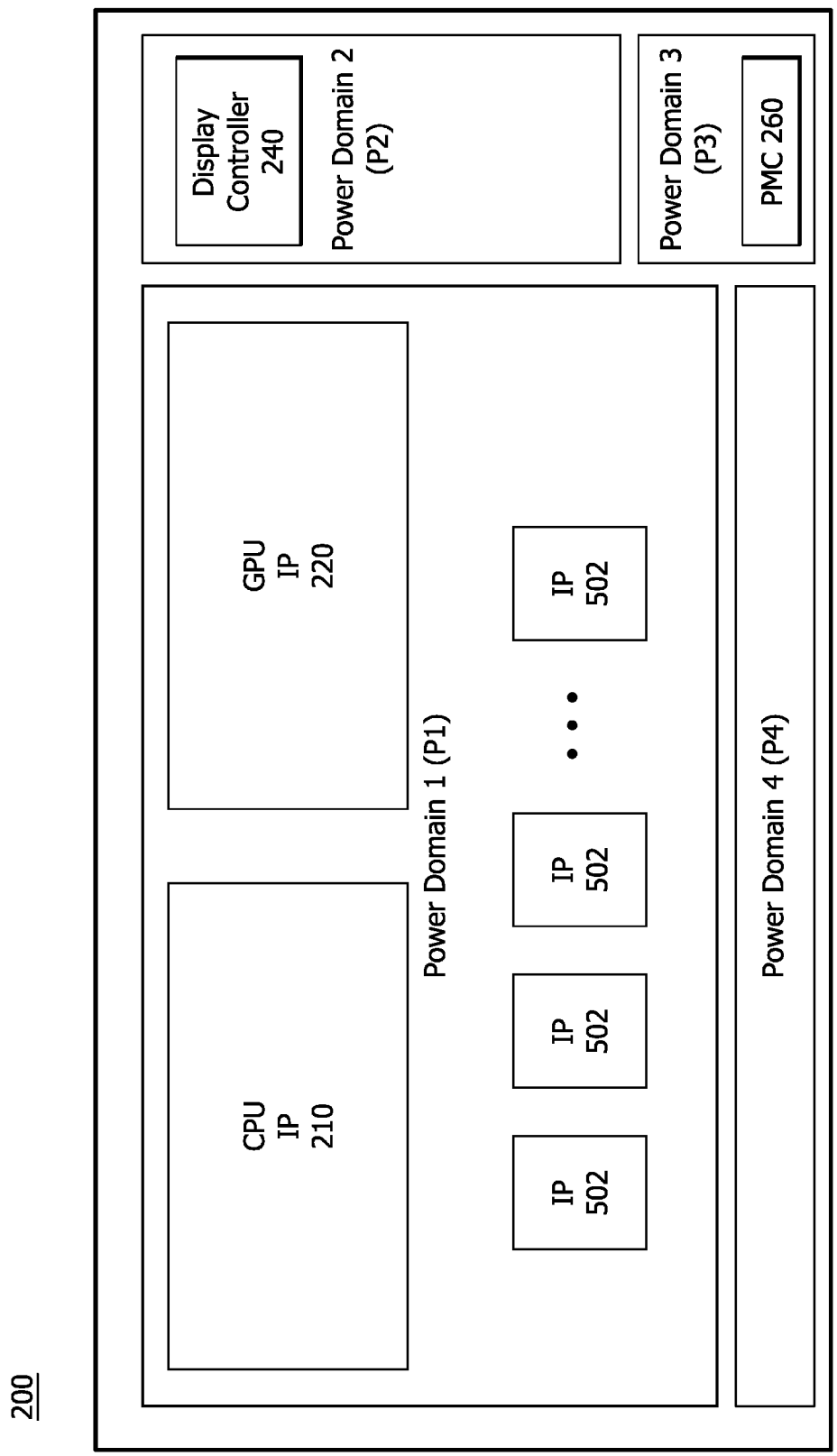
FIG. 5 is a block diagram illustrating different power domains of an example device in which one or more features of the disclosure can be implemented.

FIG. 3 is a block diagram illustrating components of PMC 260 in communication with a plurality of IP components 308. As shown in FIG. 3, the PMC 260 includes PMC hardware (HW) logic 302, IP Save/Restore middle system management units (MSMUs) 304, and main MSMU 306. PMC HW logic 302 is a hardware block (i.e., logic circuitry) which interfaces with IP components 308 (in the P1 and P2 power domains as shown in FIG. 5) according to an IP/PMC interface protocol. For example, the PMC HW logic 302 receives idleness indications of whether one or more of the IP components 308 are idle or are not idle (e.g., wake event) and performs handshaking (e.g., sends fence requests to one or more IP components 308 and receives fence acknowledgments from the one or more IP components 308).

Figure 4:
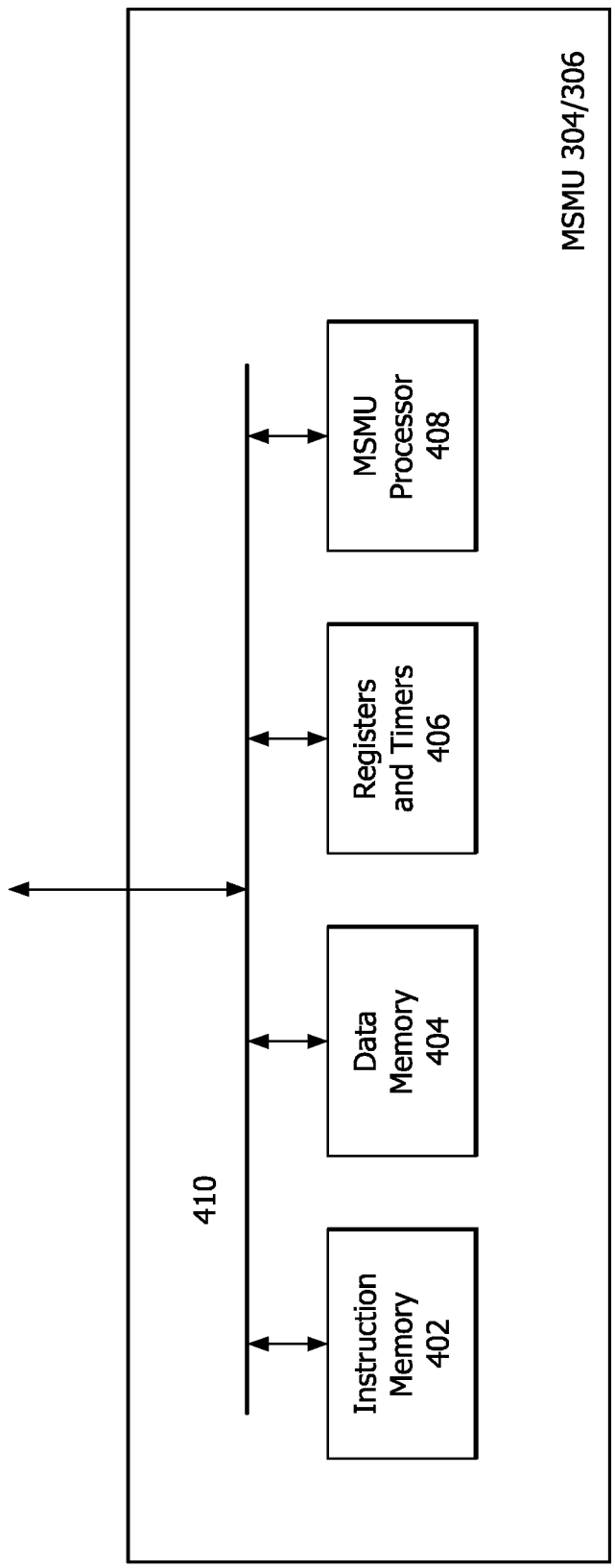
FIG. 4 is a block diagram illustrating components of a middle system management unit for implementing one or more features of the disclosure.

FIG. 4 is a block diagram illustrating components of the MSMUs 304 and 306 shown in FIG. 3. As shown in FIG. 4, the MSMUs 304 and 306 include instruction memory 402, data memory 404, registers and timers 406, instruction processor 408 and MSMU bus 410. The IP Save/Restore MSMUs 304 operate in parallel to save register data of corresponding IP components 308 in their data memory 404 and restore the register data to corresponding IP components 308 from their data memory 404.

Each MSMU processor 408 executes firmware instructions in its instruction memory 402 to save and restore the register data for its corresponding IP components 308. The instruction memory 402 includes a limited set of firmware instructions (e.g., 16 instructions) which are used to efficiently implement the register save-restore traffic (e.g., meet target latency periods between a time in which one or more IP components 308 becomes active (i.e., not idle) and a time to restore one or more IP components 308 the device 200 to an active state. The data memory 404 includes dynamic random access memory (DRAM) and static random access memory (SRAM) which are used to store data used by a corresponding IP component 308 to execute a portion of a program. The data is saved to the data memory 404 from configuration registers assigned to an IP component 308 when exiting a power state of the device 200 and restored (e.g., reloaded) to the configuration registers when entering a power state of the device 200.

The main MSMU 306 communicates with the IP Save/Restore MSMUs 304 and PMC HW logic 302 via PMC bus 310 and includes firmware instructions which are used to manage the IP Save/Restore MSMUs 304 and orchestrate the implementation of the register save-restore traffic between the IP Save/Restore MSMUs 304 and their corresponding IP components 308.

FIG. 5 is a block diagram illustrating the different power domains of the example device 200. As shown in FIG. 5, the IP components in the first power domain (P1) include CPU 210, GPU 220 and other IP components 502, such as for example multi-media processing units 230, I/O hub 250, and memory controller 270. The second power domain (P2) includes display controller 240. The third power domain (P3) includes PMC 260. The fourth power domain includes other components of device 200, such as I/O components 280.

The power states of the device 200 include, for example, 11 states ranging from Z0 (also referred to as state S0) to Z10. Features of the present disclosure can be implemented, however, for any number of power states. During the S0/Z0 power state, power is provided to each of the domains (e.g., each power rail is ON). During the Z1-Z7 states, one or more, but not each of the IP components are idle. During the Z8 and Z9 power states, CPU 210, GPU 220 and IP components 502 are idle. During the Z8 power state, power (e.g., voltage) supplied to the P1 power domain is reduced for limited functionality (e.g., display stutter). During the Z9 state, power is not supplied (i.e., power is OFF) to the P1 power domain. During the Z10 state, power is not supplied to the P1 and P2 power domains.

Figure 6:
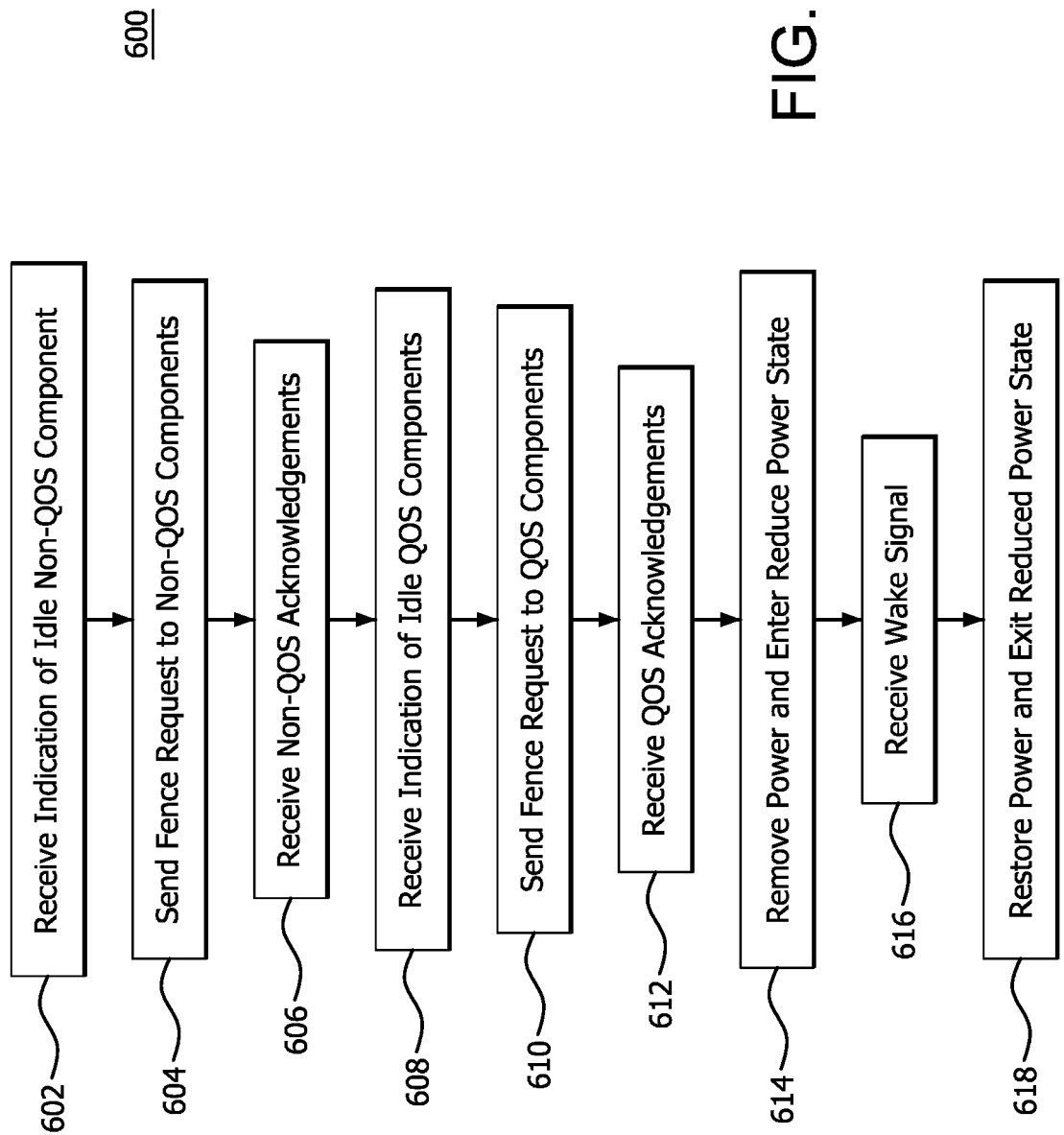
FIG. 6 is a flow diagram illustrating an example method of power state transitioning according to features of the present disclosure.

FIG. 6 is a flow diagram illustrating an example method 600 of transitioning to and from a reduced power state using a two-stage approach according to features of the present disclosure. The method 600 illustrates a successful entry into a reduced power state. Entry into the reduced power state can also be aborted as described in more detail below with regard to FIG. 8.

Figure 7:
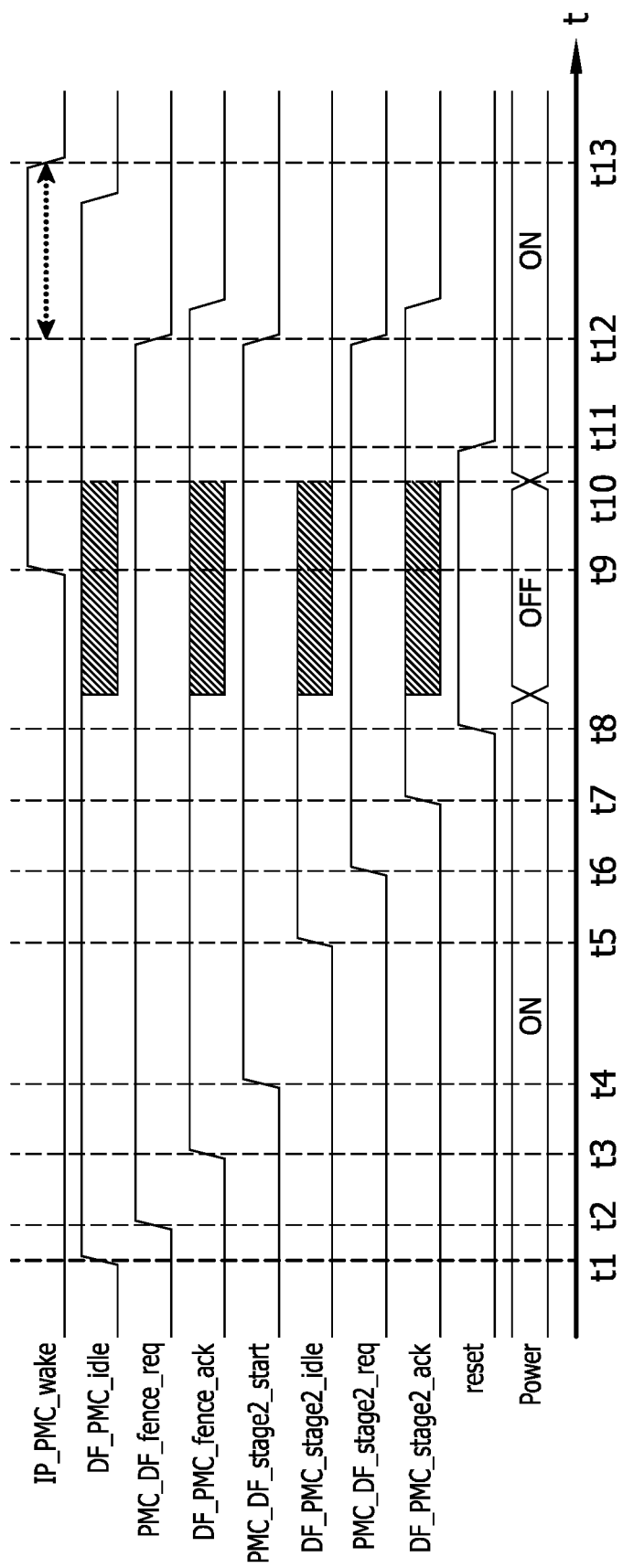
FIG. 7 is a timing diagram illustrating a two-stage transitioning process between an active power state and a reduced power state according to features of the present disclosure.

The method 600 is also described with reference to FIG. 7. FIG. 7 is a timing diagram illustrating a two-stage transitioning process between an active power state and a reduced power state according to features of the present disclosure. The example shown at FIG. 7 includes a transition from the active power state (e.g., S0 power state or Z0 power state) to the Z9 reduced power state or to the Z10 reduced power state and a transition back from the Z9 or Z10 reduced power state to the active power state (i.e., S0 power state or Z0 power state).

The PMC 260 receives a plurality of different indications for implementing transitions between power states. For example, the PMC 260 receives separate indications from each of the non-QOS components. (e.g., IP components 308 in FIG. 3) regarding the idleness (idle or not idle) of each corresponding non-QOS component 308. The non-QOS components 308 include the data fabric (DF) 205, which is both a stage 1 component as well as a stage 2 component, as described in more detail below. For simplification purposes, however, a single idleness indication signal (e.g., DF_PMC_idle) is shown in FIG. 7 to represent the combined idleness of the non-QOS IP components 308 for stage 1. That is, when the DF_PMC_idle indication is high, each of the non-QOS components 308 are idle. When the DF_PMC_idle indication is low, one or more of the non-QOS components 308 are not idle (i.e., active).

The PMC 260 also implements a handshaking process between the IP components 308. For example, PMC 260 sends fence requests to each of the non-QOS components 308 and receives fence acknowledgments from each of the non-QOS components 308. For simplification purposes, however, a single stage 1 fence request (e.g., PMC_DF_fence_req) is shown in FIG. 7 to represent the fence requests sent to each of the non-QOS components 308 for stage 1, including the data fabric (DF) 205. In addition, a single fence acknowledgment (e.g., DF_PMC_fence_ack) is shown in FIG. 7 to represent the fence acknowledgments sent to each of the non-QOS components 308 for stage 1.

The PMC 260 is also configured to receive wake signals. For example, while fence requests are sent to each IP component, some IP components (e.g., digital controller hub) are not powered off during reduced power states. One or more of these IP components, which are not powered off, send wake signals to the PMC 260 during a reduced power state. For example, when the digital controller hub receives new traffic (e.g., data), the digital controller hub sends a wake signal (i.e., IP_PMC_wake) indicating that one or more IP components are no longer idle and that the device should exit the reduced power state.

As shown at block 602 of FIG. 6, the method 600 includes receiving an indication that each of the non-QOS components, including the data fabric (DF) 205, of a device are idle. For example, the hardware logic 302 of the PMC 260 receives an indication that each of the non-QOS IP components 308 shown in FIG. 3 are idle, which begins the entry process into the reduced power state.

At time t1, IP_ZSC_idle goes high. That is, the PMC 260 receives an indication that each of the non-QOS components 308 (e.g., CPU, GPU, IO components and data fabric (DF) 205) are idle and the PMC 260 begins the entry process into the reduced power state.

As shown at block 604, the method 600 includes sending a request to remove power to the non-QOS IP components of the device. For example, at time t2, PMC 260 sends fence requests (PMC_DF_fence_req) to each of the non-QOS IP components 308, requesting permission to remove power to the IP components 308. The fence requests also provide an indication to each of the non-QOS components 308 that they should stop sending communications to the other components.

As shown at block 606, the method 600 includes receiving an acknowledgment of the fence requests. For example, at time t3, the PMC 260 receives acknowledgments (DF_PMC_fence_ack) from each of the non-QOS IP components 308, permitting PMC 260 to remove power from the non-QOS IP components 308. As described above, the DF 205 is both a stage 1 component and a stage 2 component. The DF 205 is a component which is responsible for both QOS and non-QOS functionalities. The non-QOS functionalities of the DF 205 are fenced off upon completion of the stage 1 handshake (i.e., when the PMC 260 receives acknowledgments (DF_PMC_fence_ack) from each of the non-QOS IP components 308. To meet the latency tolerance for a QOS component to enter the reduced power state (as described above), the DF is fenced, via PMC_DF_fence_req, from generating or servicing non-QOS traffic, which includes fencing the data paths used by the non-QOS components, fencing interrupt generation to non-QOS clients (e.g., CPU 210, GPU 220) and saving a portion of its register state to DRAM.

When a component receives the fence request, the data of the component is saved to DRAM (e.g., memory 290). The component acknowledges the fence request and then the remaining data (i.e., configuration register state) of the component is saved to the SRAM of a corresponding MSMU 304 such that, upon exit of the reduced power state, the reverse order can be implemented to reestablish access to the DRAM. Saving the data to the DRAM is considered a non-QOS component action to satisfy the first stage handshake.

The PMC 260 then transitions to stage 2 and PMC_DF_stage2_start is asserted (goes high) at time t4 (and when implementing a display stutter mode as described below, a display stutter request is sent to the display controller 240). After the PMC 260 transitions to stage 2, the DF 205 does not service non-QOS components (e.g., CPU, GPU and IO components), but does service QOS components (e.g., the display controller and the QOS servicing logic of the DF 205) until the non-QOS components are fenced off. That is, the QOS functionalities of the DF 205 remain operative until completion of the stage 2 handshake (i.e., when the PMC 260 receives acknowledgments (DF_PMC_stage2_ack).

As shown at block 608, the PMC 260 receives indications that QOS components, such as display controller 240 and the QOS servicing logic of the DF 205, are idle. For example, at time t5, the PMC 260 receives an indication that the display controller 204 is idle. That is, the display controller 204 fills its buffer and indicates that it is idle.

At block 610, the PMC 260 sends requests to remove power to the QOS components (e.g., the display controller 204 and the QOS servicing logic of the DF 205). For example, at time t6, PMC 260 sends fence request (PMC_DF_stage2_req) to the display controller 204 and the QOS servicing logic of the DF 205, requesting permission to remove power to the display controller 204 and the QOS servicing logic of the DF 205.

At block 612, the PMC 260 receives acknowledgments of the fence requests (PMC_DF_stage2_req). For example, at time t7, the PMC 260 receives acknowledgments (DF_PMC_stage2_ack) from the display controller 204 and the QOS servicing logic of the DF 205, permitting PMC 260 to remove power from the display controller 204 and the QOS servicing logic of the DF 205. Upon completion of the stage 2 handshake (i.e., when the PMC 260 receives acknowledgments (DF_PMC_stage2_ack), the DF 205 stops servicing the QOS components. In this example, fence requests are sent to two QOS components, a display controller and the QOS servicing logic of the DF 205. Features of the present disclosure can be implemented, however, by sending requests to the QOS servicing logic of the DF 205 any number of different QOS components and receiving acknowledgments from the QOS servicing logic of the DF 205 and any number of different QOS components.

As shown at block 614, the method 600 includes removing power and entering the reduced power state. For example, the PMC 260 uses a power reset signal (i.e., reset) to reset the power to each of the components. As shown in the example in FIG. 7, reset goes from low to high at time t8, and power is then removed (OFF in FIG. 7) from each of the components, including the non-QOS components 308 and the QOS components (e.g., the display controller 204 and the QOS servicing logic of the DF 205).

As shown at decision block 616, the method 600 includes receiving a wake signal IP_PMC_wake. For example, when one of the components (e.g., a digital controller hub) detects new traffic (e.g., data), the digital controller hub sends a wake signal (i.e., IP_PMC_wake), at time t9, to the PMC 260 indicating that one or more of the IP components 308 are no longer idle and that the device should exit the reduced power state.

As shown at decision block 618, power is restored and the device exits the reduced power state. For example, as shown in FIG. 7, power is restored at time t10. The reset goes from high to low at time t11. That is, the PMC 260 de-asserts reset and indicates to the MSMUs 304 to restore the register data to corresponding IP components 308 from their data memory 404. At time t12, the MSMUs 304 complete the restore and indicate the completion to the PMC 260, which de-asserts both stage requests.

Between time t12 and t13, DF_ZSC_ack and DF_ZSC_stage2_ack are de-asserted. The stutter path DRAM is restored and the device exits the display stutter mode. At time t13, IP_PMC_wake is de-asserted As described above, the method 600 illustrates a successful entry into a reduced power state, but that entry into the reduced power state can also be aborted. For example, in the example shown in FIG. 7, the PMC receives an indication, via the wake signal (IP_PMC_wake), that one or more of the components are no longer idle after receiving acknowledgments from each of the of the QOS components at time t7. When it is determined, however, that one or more of the QOS components or non-QOS components are no longer idle (e.g., via a wake signal) prior to receiving acknowledgments from each of the of the QOS components at time t7, entry into the reduced power state is aborted. That is PMC 260 does not save register data of IP components 308 and does not enter into the reduced power state.

Figure 8:
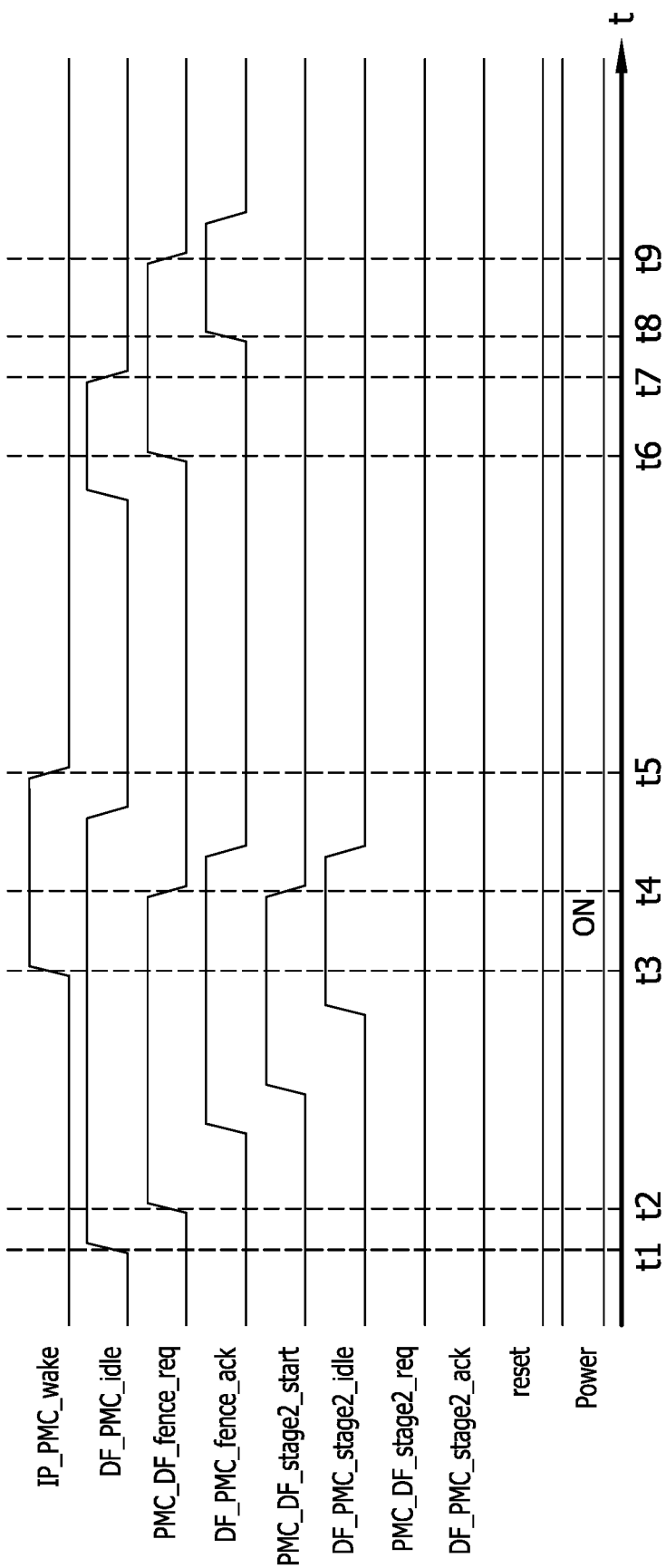
FIG. 8 is a timing diagram illustrating an example of aborting entry into a reduced power state according to features of the present disclosure.

FIG. 8 is a timing diagram illustrating an example of aborting entry into a reduced power state according to features of the present disclosure. As shown in FIG. 8, the PMC receives an indication, via the wake signal (IP_PMC_wake), that one or more of the components are no longer idle at time t3, prior to receiving acknowledgments from each of the of the QOS components at time t7. Accordingly, as shown in FIG. 8, entry into the reduced power state is aborted and the power remains ON, the reset remains low and the device does not enter into the reduced power state.

As described above, the Z9 power state supports a display stutter mode in which the display controller continuously outputs data to a display from its data buffers. When the display buffer fills up, the device enters the reduced power state. The display buffer keeps draining to provide the data to the display. When the display buffer goes below a data threshold, the device exits the reduced power state and access to memory is restored to fill the display buffer. The device then enters the reduced power state once again and the process repeats. That is, the stutter is a repeat of the stage 2 handshake for the benefit of QOS clients while keeping non-QOS clients fenced off, which avoids inefficient power consumption. For example, non-QOS clients can remain in reduced power mode during stutter, inefficient restore of non-QOS clients is avoided and the time incurred, for repeating the stage 1 idle detection and handshake process for exit and reentry, is avoided. As shown in FIG. 7, the fence requests (PMC_DF_fence_req) and the start of stage 2 (PMC_DF_stage2_start) are de-asserted (i.e., goes low) at time t12. When a display stutter mode is implemented, however, PMC_DF_fence_req and PMC_DF_stage2_start remain asserted at time t12 to indicate the stutter, such that when the QOS client completes stutter, entry to the reduced power state is repeated starting from t5 and skipping the steps prior to t5 in FIG. 7.

The various functional units illustrated in the figures and/or described herein (including, but not limited to, the processor 102, the input driver 112, the input devices 108, the output devices 110, the output driver 114, data fabric 205, CPU 210, GPU 220, memory controller 270 and PMC 260 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   a quality of service (QOS) component that has at least one QOS constraint;
   a plurality of non-QOS components that do not have the at least one QOS constraint; and
   a power management controller, in communication with the QOS component and the non-QOS components, and configured to:
      issue fences for one or more non-QOS components among the plurality of the non-QOS components when it is determined that the one or more of the non-QOS components are idle;
      issue a fence for the QOS component when the fences for the one or more non-QOS components are completed; and
      enter a reduced power state when the fence for the QOS component is completed.

2. The processing device of claim 1, further comprising a data fabric that includes
   non-QOS servicing logic configured to service the plurality of non-QOS components, wherein the one or more non-QOS components includes the non-QOS servicing logic; and
   QOS servicing logic configured to service the QOS component,
   wherein the power management controller is further configured to:
   send fence requests to the one or more non-QOS components,
   issue the fences for the one or more non-QOS components when acknowledgements of the fence requests to the one or more non-QOS components are received; and
   send a fence requests to the QOS servicing logic when the fences for the one or more non-QOS components are completed.

3. The processing device of claim 2, wherein the power management controller is configured to:
   determine whether or not one or more of the QOS component, the QOS servicing logic, or the non-QOS components are no longer idle prior to receiving the acknowledgements from the QOS component;
   when it is determined that one or more of the QOS component, the QOS servicing logic, or non-QOS components are no longer idle prior to receiving the acknowledgements from the QOS component and the QOS servicing logic, abort entry into the reduced power state; and
   when it is determined that one or more of the QOS component, the QOS servicing logic, or the one or more non-QOS components are no longer idle after receiving the acknowledgements from the QOS component and the QOS servicing logic, enter the reduced power state.

4. The processing device of claim 1, wherein the power management controller is configured to determine that one or more of the QOS component or the non-QOS components are no longer idle by receive an indication of a wake event from another component which is not powered off.

5. The processing device of claim 1, wherein the power management controller is configured to execute a process of restoring power to the QOS component when the one or more non-QOS components are indicated to be active.

6. The processing device of claim 1, wherein the QOS component is a plurality of QOS components, and
   the power management controller is further configured to issue fences to the plurality of QOS components when it is determined that the plurality of non-QOS components are idle.

7. The processing device of claim 1, further comprising a display, wherein the QOS component is a display controller configured to provide data to a display buffer for the display.

8. The processing device of claim 1, wherein the reduced power state is a state in which power is removed from the one or more non-QOS components and the QOS component.

9. The processing device of claim 1, wherein the reduced power state is a second reduced power state in which power is removed from the one or more non-QOS components and the QOS component and the power management controller is configured to transition back and forth between a first reduced power state, in which power is removed from the one or more non-QOS components and which supports a display stutter mode, and the second reduced power state.

10. A method of power state transitioning comprising:
    issuing fences for one or more non-QOS components among a plurality of non-QOS components when it is determined that the one or more non-QOS components are idle;
    issuing a fence for a QOS component when the fences for the one or more non-QOS components are completed, wherein the QOS component has at least one QOS constraint and the plurality of non-QOS components do not have the at least one QOS constraint; and
    entering a reduced power state of a processing device when the fence for the QOS component is completed.

11. The method of claim 10, further comprising:
    sending fence requests to the one or more non-QOS components, wherein the one or more non-QOS components includes a non-QOS servicing logic of a data fabric;
    issuing the fences for the one or more non-QOS components, when acknowledgements of the fence requests to the one or more non-QOS components are received; and
    sending fence requests to the QOS component and to QOS servicing logic, when the fences for the non-QOS components are completed.

12. The method of claim 11, further comprising:
    determining whether or not one or more of the QOS component, the non-QOS servicing logic, or the one or more non-QOS components are no longer idle prior to receiving the acknowledgements from the QOS component;
    when it is determined that one or more of the QOS component, the non-QOS servicing logic, or the one or more non-QOS components are no longer idle prior to receiving the acknowledgements from the QOS component and the non-QOS servicing logic, aborting entry into the reduced power state; and
    when it is determined that one or more of the QOS components, the non-QOS servicing logic, or the one or more non-QOS components are no longer idle after receiving the acknowledgements from the QOS component and the non-QOS servicing logic, entering the reduced power state.

13. The method of claim 12, further comprising determining that one or more of the QOS component or the one or more non-QOS components are no longer idle by receive an indication of a wake event from another component which is not powered off.

14. The method of claim 10, further comprising executing a process of restoring power to the QOS component when the one or more non-QOS components are indicated to be active.

15. The method of claim 10, wherein the QOS component is a plurality of QOS components, and the method further comprises:
   issuing fences to a plurality of QOS components when it is determined that the one or more non-QOS components are idle.

16. The method of claim 10, wherein the reduced power state is a state in which power is removed from the one or more non-QOS components and the QOS component.

17. The method of claim 10, wherein the reduced power state is a second reduced power state in which power is removed from the one or more non-QOS components and the QOS component and transitions back and forth between a first reduced power state, in which power is removed from the one or more non-QOS components and which supports a display stutter mode, and the second reduced power state.

18. A non-transitory computer readable medium comprising instructions for power state transitioning a processing device, the instructions when executed by the processing device cause the processing device to execute a method comprising:
   issuing fences for one or more non-QOS components among a plurality of non-QOS components when it is determined that the one or more non-QOS components are idle;
   issuing a fence for a QOS component when the fences for the one or more non-QOS components are completed, wherein the QOS component has at least one QOS constraint and the plurality of non-QOS components do not have the at least one QOS constraint; and
   entering a reduced power state of a processing device when the fence for the QOS component is completed.

19. The non-transitory computer readable medium of claim 18, wherein the method further comprise:
   sending fence requests to the one or more non-QOS components, wherein the one or more non-QOS components includes a non-QOS servicing logic of a data fabric;
   issuing the fences for the one or more non-QOS components, when acknowledgements of the fence requests to the one or more non-QOS components are received; and
   sending fence requests to the QOS component and to QOS servicing logic, when the fences for the one or more non-QOS components are completed.

20. The non-transitory computer readable medium of claim 19, wherein the method further comprises:
   determining whether or not one or more of the QOS component, the non-QOS servicing logic, or the one or more non-QOS components are no longer idle prior to receiving the acknowledgements from the QOS component;
   when it is determined that one or more of the QOS component, the non-QOS servicing logic, or the one or more non-QOS components are no longer idle prior to receiving the acknowledgements from the QOS component and the non-QOS servicing logic, aborting entry into the reduced power state; and
   when it is determined that one or more of the QOS components, the non-QOS servicing logic, or the one or more non-QOS components are no longer idle after receiving the acknowledgements from the QOS component and the non-QOS servicing logic, entering the reduced power state.

* * * * *